United States Patent [19]

Ono

[11] Patent Number: 4,866,621

[45] Date of Patent: Sep. 12, 1989

[54] PREDICTIVE OPERATION TYPE ELECTRONIC CLINICAL THERMOMETER

[75] Inventor: Kazuhito Ono, Tokyo, Japan

[73] Assignee: Citizen Watch Co., Ltd., Tokyo, Japan

[21] Appl. No.: 117,178

[22] Filed: Nov. 4, 1987

[30] Foreign Application Priority Data

Nov. 5, 1986 [JP] Japan .................................. 61-263572

[51] Int. Cl.⁴ ............................................ G06F 15/42
[52] U.S. Cl. ................................ 364/413.03; 128/736; 364/557; 374/107
[58] Field of Search ................... 128/736; 364/413.03, 364/557; 374/102, 103, 107, 142

[56] References Cited

U.S. PATENT DOCUMENTS

| | | | |
|---|---|---|---|
| 4,541,734 | 9/1985 | Ishizaka | 128/736 X |
| 4,574,359 | 3/1986 | Ishizaka et al. | 374/107 X |
| 4,592,000 | 5/1986 | Ishizaka et al. | 374/102 X |
| 4,629,336 | 12/1986 | Ishizaka | 128/736 X |
| 4,648,055 | 3/1987 | Ishizaka et al. | 374/107 X |
| 4,727,500 | 2/1988 | Jackson et al. | 128/736 X |

Primary Examiner—Parshotam S. Lall
Assistant Examiner—Edward R. Cosimano
Attorney, Agent, or Firm—Townsend and Townsend

[57] ABSTRACT

An electronic clinical thermometer capable of calculating a prediction value of an optimal equilibrium temperature. The thermometer includes a temperature detection section, an operation section, and a display section. The operation section includes a temperature memory circuit for temporarily storing temperature data detected by the temperature detection section. In addition, the operation section includes a time measuring circuit for measuring the elapsed time of temperature detection and outputting elapsed time data. A parameter calculation section for receiving temperature data and elapsed time data is used to calculate parameters of the equation. Finally, a prediction value calculator is required for calculating an equilibrium temperature according to a predetermined equation using parameters updated by the parameter calculation section.

5 Claims, 11 Drawing Sheets

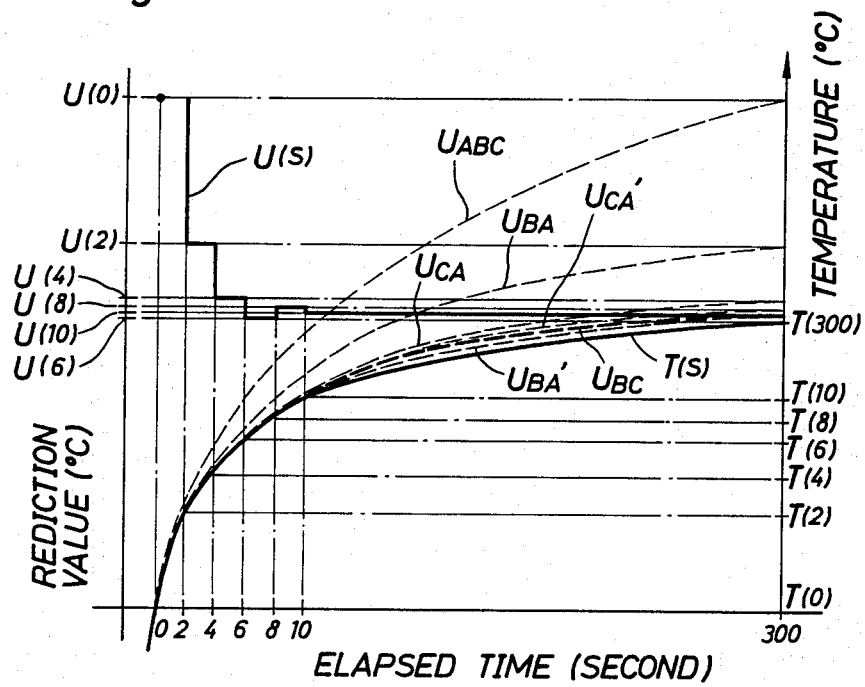

PREDICTIVE OPERATION TYPE ELECTRONIC CLINICAL THERMOMETER

BACKGROUND OF THE INVENTION

1. Field of the Invention

The present invention relates to a clinical thermometer for calculating a prediction value of an equilibrium temperature on the basis of a temperature of a portion of body to be measured.

2. Description of the Prior Art

A conventional electronic clinical thermometer capable of calculating a prediction value is disclosed, e.g. in U.S. Pat. No. 4,629,336, which will be described below with reference to FIGS. 1 and 2.

FIG. 1 is a block diagram showing a basic arrangement of a conventional electronic clinical thermometer for calculating a prediction value. The electronic clinical thermometer capable of prediction is basically constituted by a temperature detection section 1, an operation section 2 including a parameter selector 16, and a display section 3. The temperature detection section 1 includes a sensor such as a thermistor and serves as a circuit for detecting a temperature of a portion to be measured in a real-time manner. The operation section 2 calculates an equilibrium temperature in response to a temperature signal from the temperature detection section 1 when predetermined conditions are satisfied, and outputs the resultant value to the display section 3 as a statistical prediction equilibrium temperature (to be referred to as a prediction value hereinafter). The parameter selector 16 serves as a circuit for feeding back an operation result of the prediction value to select coefficient parameters (to be referred to as parameters hereinafter) of an equation for providing a more accurate prediction value.

FIG. 2 is a block diagram showing a detailed arrangement of the conventional electronic clinical thermometer capable of prediction.

The temperature detection section 1 is constituted by a sensor 5 such as a thermistor and a temperature detector 6. The temperature detector 6 detects an electrical signal from which the sensor 5 outputs in response to a temperature of a portion to be measured, and intermittently outputs temperature data 21 and 22 corresponding to the detected electrical signal to the operation section 2.

The operation section 2 comprises a measurement control circuit 7, a time measuring circuit 8, a temperature memory circuit 9, a prediction value calculator 10, a prediction value monitor circuit 15, and the parameter selector 16. The measurement control circuit 7 receives a temperature data signal 21 from the temperature detector 6, always monitors the temperature of the portion to be measured in a real-time manner, and outputs a prediction start signal 24 to the time measuring circuit 8 when the temperature data satisfies predetermined conditions. At the same time, the measurement control circuit 7 keeps outputting operation command signals 23 to the prediction value calculator 10 in synchronism with the temperature data signals 21 intermittently supplied from the temperature detector 6 until the predetermined conditions are satisfied. The time measuring circuit 8 starts counting time at the same time when the temperature detector 6 outputs the temperature data signal after a power switch of the electronic clinical thermometer is turned on and the circuit is energized. When the time measuring circuit 8 receives the prediction start signal 24 from the measurement control circuit 7, time data thus obtained is reset and counting of time is restarted. This time data is output to the prediction value calculator 10 as elapsed time data 25. The temperature memory circuit 9 serves as a circuit for temporarily storing the temperature data 22 in accordance with a predetermined rule when the temperature data 22 from the temperature detector 6 is input to the temperature memory circuit 9, and outputs the stored data to the prediction value calculator 10 as needed. The prediction value calculator 10 is programmed with a functional equation for obtaining a prediction value as a function of an elapsed time and a temperature by using several parameters which affect a calculation of the prediction value of an equilibrium temperature. In an initial state, i.e., when the operation command signal 23 from the measurement control circuit 7 is input to the prediction value calculator 10 at the first time, the parameters are reset and predetermined values are set. The prediction value calculator 10 calculates a prediction value according to the above equation, in which the parameters are set, using temperature data 26 from the temperature memory circuit 9 and the elapsed time data 25 from the time measuring circuit 8. The prediction value calculator 10 outputs the resultant data to the prediction value monitor circuit 15 as prediction value data 30. The prediction value monitor circuit 15 always monitors the prediction value data 30 periodically input thereto. When a change in prediction value as a function of time, e.g., falls within a given range for a predetermined period of time, the prediction value monitor circuit 15 determines that the result of the prediction value calculated by the prediction value calculator 10 is correct, i.e., that selection of the parameters which determine the functional equation is correct, thereby outputting a prediction value signal 33 to the display section 3. When the prediction value exceeds the given range within the predetermined period of time, a negative-feedback control signal 32 is output to the parameter selector 16 together with the prediction value 33. The parameter selector 16 receives the negative-feedback control signal 32 and updates the parameters which affect the calculation of the prediction value. More specifically, the parameter selector 16 selects parameter values for reducing the change in prediction value for the predetermined time from several preset values. Thereafter, the updated parameter data is output to the prediction value calculator 10 as an electrical signal 31. The prediction value calculator 10 receives the electrical signal 31, and then receives the operation command signal 23 from the measurement control circuit 7 again, so that the prediction value calculator 10 calculates a prediction value in accordance with the elapsed time data signal 25 from the tim measuring circuit 8 and the temperature data 26 from the temperature memory circuit 9 on the basis of the updated parameters. A prediction value thus calculated is output as the prediction value data 30 again, and monitored by the prediction value monitor circuit 15. The above-described process is repeated in the prediction value monitor circuit 15. As a result, the prediction value is displayed on the display section 3 while the prediction value is continuously updated.

The above description will be explained with reference to characteristic graphs shown in FIGS. 3 and 4. In FIG. 4, reference symbol T(t) denotes an actual body temperature rise curve, which is plotted as a continuous curve based on temperature data detected and intermittently output by the temperature detector 6. Points $T(t_0)$, $T(t_1)$, .... on $T(t)$ represent temperatures at elapsed times $t_0, t_1, \ldots$, respectively. Reference symbol $W(t)$ denotes a line which is plotted to show a continuous change in prediction value displayed on the display section 3 as a function of the lapse of time. Since the parameters of the equation for calculating the prediction value are changed, and the prediction value is corrected, the line $W(t)$ is plotted stepwisely as a whole. Reference symbols $W(t_0)$, $W(t_1)$, ... denote the corrected prediction values at elapsed times $t_0, t_1, \ldots$ In addition, reference symbol $T(t_n)$ denotes an actual equilibrium temperature at elapsed time $T_n$.

A method of calculating a prediction value in the prediction value calculator 10 will be described below. The prediction value $W(t)$ of an equilibrium temperature is expressed by the following equation.

$$W(t) = T(t) + V(t)$$

$V(t)$ is a so-called correction value as a function of elapsed time t, and is solely determined by a value of a parameter C. For example, in FIG. 3, a plurality of curves indicated by narrow broken lines, which represent an equation $V(t)$ for obtaining correction values when the value of the parameter C is $C_0, C_1, \ldots$. The plurality of curves are required for $V(t)$ to cope with variations in body temperature rise curves due to personal differences or different measuring conditions. Accordingly, an appropriate correction value $V(t)$ can be selected by updating the value of the parameter C. The parameter C is updated at the elapsed times $t_0, t_1, \ldots$ and $V(t_0), V(t_1), \ldots$ are correction values after the parameter C is updated.

When the power source is turned on and an entire circuit shown in FIG. 6 is operated, the temperature detector 6 converts electrical signals output from the sensor 5 in response to an ambient temperature into corresponding temperature data at predetermined intervals of time, e.g., every two seconds, and outputs them as the temperature signals 21 and 22. The measurement control circuit 7 always monitors the temperature data signal 21 input thereto, and outputs the prediction start signal 24 and the operation command signal 23 when the temperature data satisfies a predetermined condition. In this case, however, the conditions are not satisfied, and hence the signals are not output. The predetermined condition means, e.g., that 10 seconds have elapsed after the temperature exceeds 30° C. and rises at a rate of 0.1° C./sec.

The time measuring circuit 8 starts counting elapsed time immediately after the power switch is turned on, and the temperature memory circuit 9 stores the temperature data each time the temperature data signal 22 is input thereto according to the predetermined rule. In this state, when the sensor 5 is inserted in a portion to be measured, the value of the temperature data is increased along a curve $T(t)$ plotted in FIG. 8. When the temperature data satisfies the predetermined condition (10 seconds have elapsed after the temperature exceeds 30° C. and rises at a rate of 0.1° C./sec) at time $t_0$, the predicton value calculator 10 starts operation after the parameter C of the equation for providing the prediction value is reset by receiving the operation command signal 23 from the measurement control circuit 7.

The time measuring circuit 8 is reset by receiving the prediction start signal 24, and restarts counting an elapsed time. In this case, elapsed time is $t_0$. When operation is started at elapsed time $t_0$, the parameter C is reset to be a value of an equation for providing a prediction value of an equilibrium temperature corresponding to an average body temperature rise curve from the statistical point of view. In this case, the value is given as $C_0$. The above correction value $V(t)$ whose value of the parameter C is $C_0$ can be represented by a curve indicated by a broken line of $C=C_0$ in FIG. 3.

As an operation result, the correction value is given as $V(t_0)$ when the parameter C is $C_0$ and the elapsed time data is $t_0$. In this case, the prediction value $W(t_0)$ is obtained from current temperature data $T(t_0)$ as follows:

$$W(t_0) = T(t_0) + V(t_0)$$

and is output from the prediction value calculator 10 as a prediction value data 30. Thereafter, a curve corresponding to the function $V(t)$ for obtaining a correction value, in which $C=C_1$, is plotted. In synchronism with sampling of the temperature at predetermined time intervals, e.g., every two seconds, the prediction value calculator 10 calculates prediction values according to the above equation using the corresponding elapsed time data signals 25 and the corresponding temperature data 26 and outputs the resultant values to the display section 3 through the prediction value monitor circuit 15. As a result, the value corresponding to the curve $W(t)$ showing the prediction value between elapsed times $t_0$ and $t_1$ in FIG. 4 is displayed as a numerical value.

The prediction value monitor circuit 15 always monitors a change value $|dW(t)/dt|$ of the prediction value as a function of time. When the change amount exceeds a predetermined value, e.g., a ($|dW(t)/dt|>a$) continues within a given period of time, the prediction value monitor circuit 15 outputs the negative feedback control signal 32 so that a new parameter C is selected by the parameter selector 16 and is output to the prediction value calculator 10 as the electrical signal 31. When the above condition ($|dW(t)/dt|>a$) is satisfied at elapsed time $t_1$ in FIG. 4, the parameter C is updated to a new value $C_1$, and hence the equation $V(t)$ for obtaining a correction value is represented by a curve of $C=C_1$. A prediction value $W(t_1)$ at elapsed time $t_1$ can be expressed using corresponding temperature data $T(t_1)$ and a corresponding correction value $V(t_1)$ as follows:

$$W(t_1) = T(t_1) + V(t_1)$$

A parameter is selected by the parameter selector 16 by the following method. The parameter selector 16 selects an appropriate curve $V(t)$ for providing a correction value with respect to a body temperature rise curve depending on cases, i.e., $dW(t)/dt > a$ or $dW(t)/dt < -a$ (a is a positive number), and changes the parameter C in a direction where $dW(t)/dt$ is decreased. For example, since $dW(t)/dt < -a$ in FIG. 8, the value $C_1$ of the parameter C is selected such that $C_1 < C_0$. In practice, the value $C_1$ is given by subtracting a predetermined value from the value $C_0$, e.g. $C_1 = C_0 - 1$. Subsequently, the parameter C can be given in the same manner as described above. In general, $$C_n = C_{n-1} 1$$

where n is an integer. The predetermined value is not limited to 1, but can be changed with the lapse of time.

After the value of the parameter C is selected at elapsed time $t_1$ and the value $C_0$ is replaced with the value $C_1$, the function V(t) for providing a correction value is changed with the lapse of time as shown by the curve $C=C_1$ in FIG. 7, and hence the numeral value corresponding to the curve of the prediction value W(t) between elapsed times $t_1$ and $t_2$ is output to the display section 3. Thereafter, a loop (negative-feedback operation) constituted by the prediction value calculator 10, prediction value monitor circuit 15, and the parameter selector 16 continues in a similar process. During that time, the value of the parameter C is updated to $C_2$, $C_3$, and $C_4$ at elapsed times $t_2$, $t_3$, and $t_4$, respectively. As a result, the prediction values W(t) are successively output to the display section 3 as values plotted as a curve shown in FIG. 4.

After the value of the parameter C is changed to a value $C_4$ at elapsed time $t_4$, if the change amount of the prediction value W(t) after a predetermined period of time falls within the predetermined range, i.e., $|dW(t)/dt| < a$ (a is a value of the predetermined value), the prediction value monitor circuit 15 determines that the equation V(t) for providing a correction value is optimal for a body temperature rise curve currently measured and informs a user of the current decision as an optimal decision by a buzzer or the like.

In FIG. 2 illustrating the conventional example, the process wherein a prediction value is calculated in the prediction value calculator 10, monitored in the prediction value monitor circuit 15, and negatively fed back to the parameter selector 16 is made to improve adaptive precision of an equation corresponding to an actual body temperature rise curve by selecting a new parameter of the functional equation to be operated depending on a change in prediction value, which is an operation result, as a function of time and by feeding back the resultant value, thereby obtaining an accurate prediction value.

However, as is apparent from FIG. 4, since each parameter for determining the equation to be operated is selected step by step according to a predetermined order and sequentially changed, a certain number of updating cycles is required to select an optimal parameter.

As is apparent from FIG. 3, according to the conventional example, only one parameter determines an equation to be operated. Therefore, even if a an equation is arranged to be exclusively used for a body portion to be measured, e.g., the mouth or an armpit, since only one parameter is selected from a predetermined value, an optimal value is not necessarily obtained, thereby degrading selection of the parameter. More specifically, since a number of equations obtained by selecting a given number of parameters from the predetermined number of parameters is limited, variations in temperature curve due to personal differences and different measuring states cannot be sufficiently coped with, thereby posing a problem in terms of accurate measurement.

As has been described above, in the conventional electronic clinical thermometer capable of predicting values, the advantages obtained by means of prediction have not been sufficiently utilized.

SUMMARY OF THE INVENTION

It is a first object of the present invention to solve the above problems, and to provide an electronic clinical thermometer capable of calculating a prediction value of an optimal equilibrium temperature with high precision within a short period of time.

It is a second object of the present invention to provide an electronic clinical thermometer capable of predicting an optimal equilibrium temperature using a first parameter for determining a Y-coordinate of a body temperature prediction curve, a second parameter for determining an X-coordinate of the curve, and a third parameter for determining a curvature of the curve.

It is a third object of the present invention to provide an electronic clinical thermometer capable of predicting an optimal equilibrium temperature using a previously calculated parameter as one of three parameters for determining a body temperature prediction curve and using currently calculated parameters as the remaining two parameters.

BRIEF DESCRIPTION OF THE DRAWINGS

FIG. 20 is a graph illustrating a change in actual body temperature rise curve and prediction value as a function of time according to the present invention.

DETAILED DESCRIPTION OF THE PREFERRED EMBODIMENT

A method of calculating an equation for providing a prediction value of a body temperature and parameters of the equation, and a method of calculating a prediction value of a body temperature according to the present invention will be described.

Figure 5:
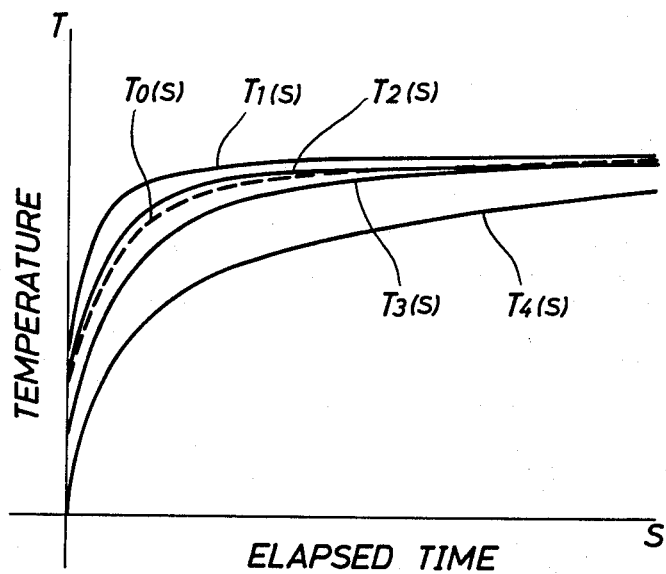
FIG. 5 is a graph showing various body temperature rise curves based on differences in measuring conditions.

FIG. 5 is a graph showing a body temperature rise curve, i.e., illustrating a change in temperature observed from a start of measurement to a state of an equilibrium temperature as a function of time. As has been described above, the body temperature rise curve is variously changed as indicated by $T_{1(s)}$ to $T_{4(s)}$ depending on personal differences and body portions to be measured nd physical characteristics (mainly a heating capacity) of a sensor. The body temperature curves apparently have no regularity. However, a representative body temperature rise curve $T_{0(s)}$ obtained by collecting data, accurately reproducing them, statistically analyzing them, and calculating a mean value of all data can be approximated by the following functional equation (1).

$$U_{(s)} = A - C/(S + B) \qquad (1)$$

Equation (1) is the one for providing a prediction value of a body temperature according to the present invention. Accordingly, equation (1) is not theoretically introduced from results obtained by analyzing a process of temperature rise, but is an inductive equation empirically obtained from the data collected by actually measuring temperatures of many people in various conditions. In equation (1), $U_{(s)}$ is a prediction value of a body temperature, S is an elapsed measurement time (second), and A, B, and C are parameters for allowing functional equation (1) to flexibly correspond to differences in measuring conditions and thermal characteristics of an organism. Characteristics of the parameters will be described below.

Elements (i), (ii), and (iii) are for changing a process of a body temperature rise (rise curve) as follows:

(i) Thermal characteristics of an organism (a factor of a change in temperature gradient)

This factor includes a heat capacity at a local portion to be measured, a thermal conductivity from a surface of the portion to be measured, a blood flow rate under the skin, and the like, and changes the gradient of the rise curve. For example, a rise curve of a slender young person can be given by a steep curve as indicated by $T_{1(s)}$ in FIG. 5.

(ii) Thermal equilibrium body temperature (a factor of a change in terminal value)

This factor changes an end point of the rise curve corresponding to a body temperature to be measured.

(iii) Ambient temperature (a factor of a change in a start point)

In order to measure a thermal equilibrium body temperature, i.e., a body temperature several centimeters under the skin, a portion to be measured must be shielded from an ambient temperature, while a thermal gradient between the portion to be measured and the area under the skin must be very small by supplying heat from the flow of blood. More specifically, a temperature of the portion to be measured when the portion is shielded (in many cases, an ambient temperature) is an important initial condition, which changes the start point of the rise curve.

For example, when a body temperature is measured in cold open air, the start point is shifted to a position corresponding to a lower temperature (lower direction) as indicated by $T_{4(s)}$ in FIG. 5.

Figure 6:
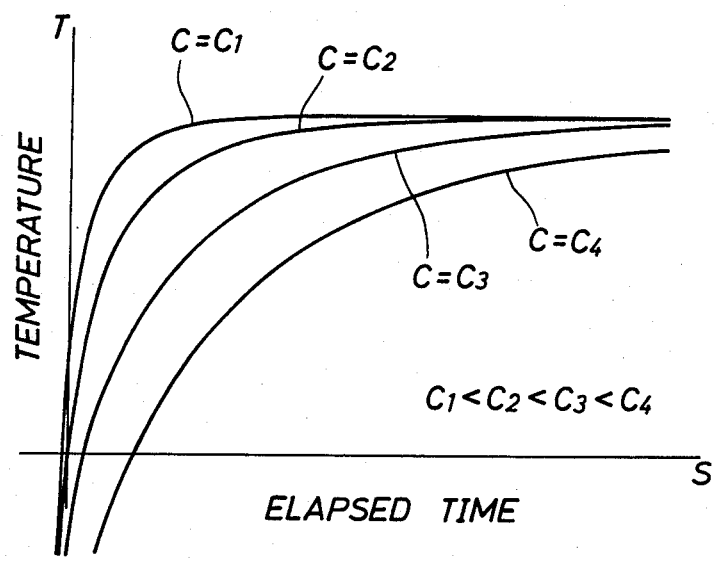
FIG. 6 is a graph showing different body temperature prediction curves when a gradient parameter C is updated.
Figure 7:
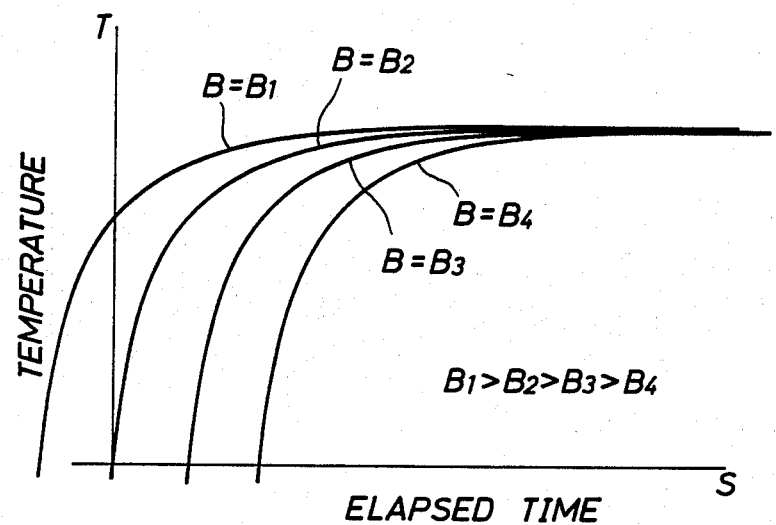
FIG. 7 is a graph showing a change in body temperature prediction curve when a start point parameter B is updated.
Figure 8:
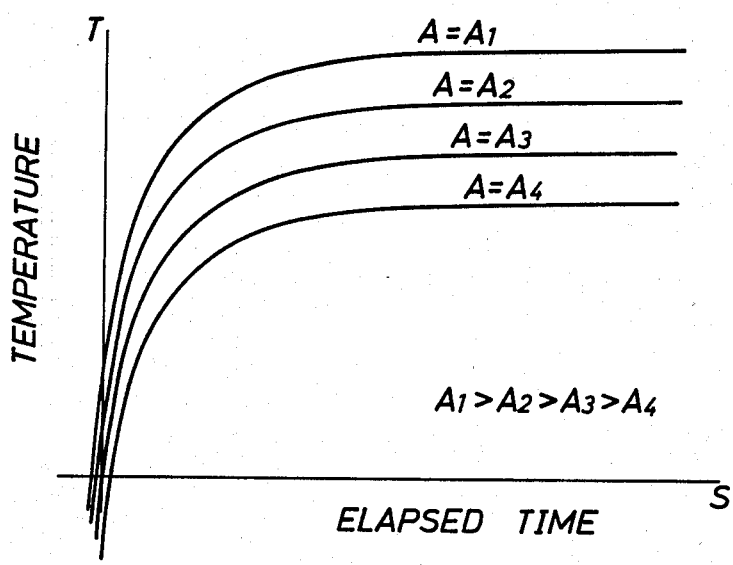
FIG. 8 is a graph showing a change in body temperature rise prediction curve when an end point parameter A is updated.

The relationship between the three elements (i), (ii), and (iii) and the parameters A, B, and C can be rearranged as follows:

A corresponds to the element (ii) (an end point parameter). B corresponds to the element (iii) (a start point parameter). C corresponds to the element (iii) (a gradient parameter). FIGS. 6 to 8 show characteristic curves illustrating changes in prediction curves based on equation (1) using these parameters.

More specifically, FIG. 6 shows different prediction curves when only the gradient parameter C is updated to values $C_1$ to $C_4$. FIG. 7 shows different prediction curves when only the start point parameter B is updated to values $B_1$ to $B_4$. FIG. 8 shows different prediction curves when only the end point parameter is updated to values $A_1$ to $A_4$, respectively.

Figure 9:
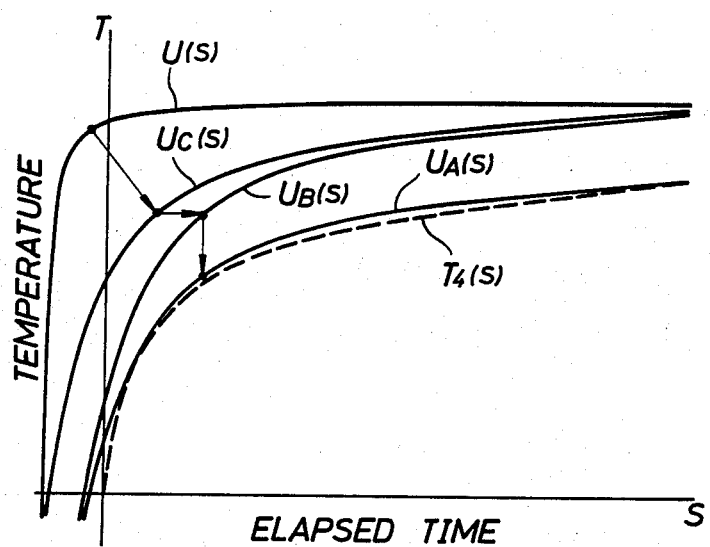
FIG. 9 is a graph showing a change in body temperature prediction curve when the three kinds of parameters are sequentially updated to obtain an optimal curve.

FIG. 9 shows prediction curves obtained by updating the three parameters A, B, and C. Reference symbol $T_{4(s)}$ denotes one of the temperature rise curves shown in FIG. 5. FIG. 9 shows a state wherein a prediction curve $P_{(s)}$ calculated based on the rise curve $T_{4(s)}$ is continuously corrected.

More specifically, the gradient parameter C of a prediction curve $U_{(s)}$ calculated from the first measurement data of the rise curve $T_{4(s)}$ is updated using the second and subsequent measurement data, thereby obtaining a prediction curve $U_{C(s)}$. A prediction curve $U_{B(s)}$ can be obtained by updating the start point parameter B. Consequently, a prediction curve $U_{A(s)}$ can be obtained by updating the end point parameter A.

Even if the prediction curve $U_{(s)}$ tentatively obtained from the first measurement data is very different from the actual body temperature rise curve $T_{4(s)}$, the prediction curve $U_{A(s)}$ which is very similar to the actual body temperature curve can be obtained by updating the three parameters A, B, and C according to the second and subsequent data measurement data.

In order to facilitate understanding of the operation, FIG. 9 shows a change in prediction curve when the parameters are updated and optimized one by one. In practice, calculation of a prediction curve is performed using a system wherein a plurality of parameters are updated at once. However, the basic operations are the same as described above.

The equations and parameters according to the present invention have been described above. A method of predicting and calculating parameters based on an actual body temperature measurement data will be described below.

Figure 10:
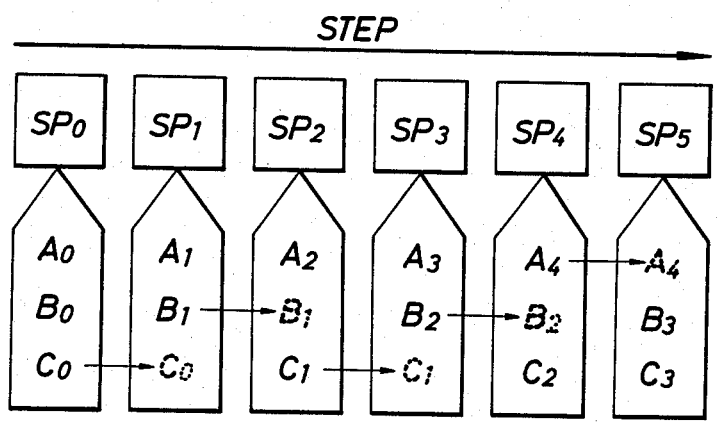
FIG. 10 is a view showing steps of operating parameters according to the present invention.

FIG. 10 shows each step of the prediction process. Reference symbols $SP_0$ to $SP_5$ denote steps of calculating parameters, respectively. Parameters are shown in each step, in which parameters represented by solid letters are updated parameters in each step, and parameters represented by dotted letters are the parameters which have been calculated and are used without updating.

Each step shown in FIG. 10 will be described in detail later. The principle is that the parameters A, B, and C are calculated as tentative values $A_0$, $B_0$, and $C_0$ using the first measurement data in step $SP_0$ where the parameter calculation mode is started. In the next step $SP_1$, new parameters $A_1$ and $B_1$ are calculated using the next measurement data while applying the value $C_0$ calculated in step $SP_0$. Subsequently, in step $SP_2$, new parameters $A_2$ and $C_1$ are calculated by applying the value $B_1$ calculated in step $SP_1$. After the operation is performed in steps $SP_3$ and $SP_4$ in the same manner as described above, in step $SP_5$, new parameters $B_3$ and $C_3$ are calculated by applying a value $A_4$ calculated in step $SP_4$ to the parameter A, thereby calculating a prediction value $U_{(se)}$ of a body temperature after a predetermined period of time $S_e$ by applying these three parameters $A_4$, $B_3$, and $C_3$. In steps $SP_1$ to $SP_4$, the two kinds of parameters including the parameter A are alternately calculated. The reason why this method is employed is that if the three kinds of parameters are simultaneously updated, a prediction value (display value of a body temperature) is greatly influenced by a variation in measurement data, and hence greatly changed. Therefore, according to the present invention, only the two kinds of parameters including the parameter A exerting the greatest influence on the prediction value are updated, while the remaining parameter is the previous value, thereby preventing an excessive variation in display value of the body temperature.

Contents of measurement data stored in each step and a temperature gradient K calculated based on the stored measurement data will be described prior to a description of each step.

Figure 11:
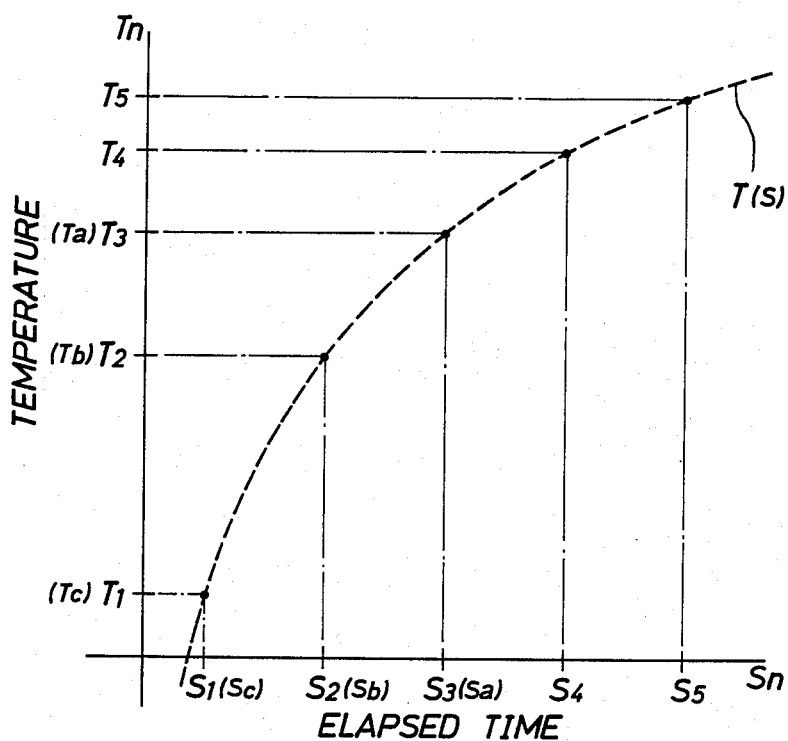
FIG. 11 is a graph showing a sampling operation of a body temperature rise curve.

FIG. 11 is a graph wherein body temperature rise curve $T_s$ is sampled within sampling time $S_n$ to obtain temperature data $T_n$. The contents of the temperature data are shown in table 1.

TABLE 1

| Memory area Date Step | $M_a$ $T_a$ | $M_b$ $T_b$ | $M_c$ $T_c$ |
|---|---|---|---|
| $SP_0$ | $T_3$ | $T_2$ | $T_1$ |
| $SP_1$ | $T_4$ | $T_3$ | $T_2$ |
| $SP_2$ | $T_5$ | $T_4$ | $T_3$ |

In table 1, reference symbols $M_a$ to $M_c$ denote three memory areas arranged in the temperature memory circuit later described; $T_a$ to $T_c$, data to be stored in the memory areas $M_a$ to $M_c$; $T_a$, temperature data currently sampled at time $S_a$; $T_b$, temperature data sampled at immediately preceding time $S_b$; and $T_c$, temperature data sampled at time $S_c$, i.e., two measurements ahead of the current measurement. Therefore, if a timing of sampling time $S_3$ shown in FIG. 15 corresponds to step $SP_0$, $S_a=S_3$, $S_b=S_2$, and $S_c=S_1$, and hence the data $T_a$ in the memory area $M_a$ becomes temperature data $T_3$, the data $T_b$ in the memory area $M_b$ becomes temperature data $T_2$, and the data $T_c$ in the memory area $M_c$ becomes temperature data $T_1$. In step $SP_1$ at a timing of sampling time $S_4$, since $S_a=S_4$, $S_b=S_3$, and $S_c=S_2$, each temperature data is shifted to the next step, so that the data $t_a$ becomes temperature data $T_4$, the data $T_b$ becomes temperature data $T_3$, and the data $T_c$ becomes temperature data $T_2$. Subsequently, in each step, temperature data shifted one by one are stored as the data $T_a$ to $T_c$. A combination of the three data $T_a$ to $T_c$ are used to calculate new parameters in each step.

A method of calculating the temperature gradient K as a basis of parameter calculation using the three data $T_a$, $T_b$, and $T_c$ will be described below.

Figure 12:
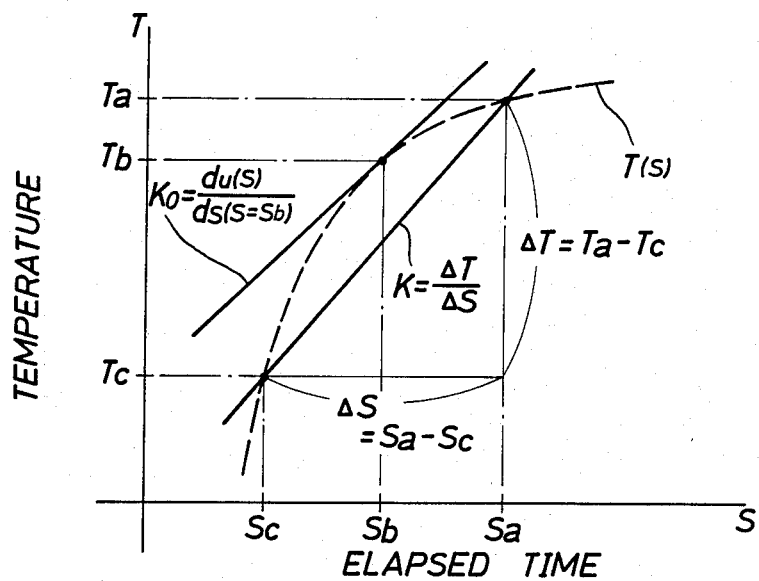
FIG. 12 is a graph showing a state wherein a temperature gradient K is obtained from a body temperature rise curve.

A tangent $K_0 = dT_{(s)}/dS$ ($s = S_b$) of the body temperature rise curve $T_{(s)}$ shown in FIG. 12 at time $S_b$ which is an intermediate point between sampling times $S_a$ and $S_c$ is the only one which is truly required to be obtained using the temperature data $T_a$ to $T_c$ corresponding to sampling times $S_a$ to $S_c$. However, since the tangent $K_0$ cannot be directly obtained from the three temperature data $T_a$, $T_b$, and $T_c$, an approximate value $K = \Delta T/\Delta S$ ($\Delta T = T_a - T_c$ and $\Delta S = S_a - S_c$) of the temperature gradient is calculated and $K \approx K_0$. As is apparent from FIG. 12, an error in the above approximation can be neglected in practice.

Calculation of the parameters and the prediction process will be described in detail in accordance with each step shown in FIG. 10.

Step $SP_0$

Figure 13:
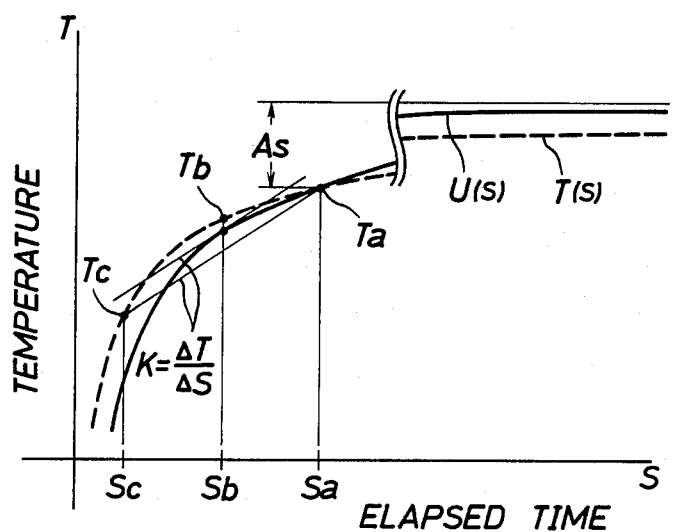
FIG. 13 is a graph showing a state wherein initial values of parameters are set using a body temperature rise curve.

As shown in FIG. 10, in this step, the first parameters $A_0$, $B_0$, and $C_0$ are calculated as tentative values. When the parameter calculation mode is started, simultaneous equations (2) are established from the temperature data stored in the memory areas $M_a$, $M_b$, and $M_c$ set as $T_a = T_3$, $T_b = T_2$, and $T_c = T_1$, as shown in Table 1, and the sampling time data $S_a$, $S_b$, and $S_c$, as shown in FIG. 13 as follows:

$$A_0 = T_a + A_s \tag{2a}$$

$$dU_{(s)}/dS_{(Sb)} = K \tag{2b} \quad (2)$$

$$U_{(Sa)} = T_a \tag{2c}$$

In equation (2), $A_s$ is a constant statistically obtained from a representative body temperature rise curve, and an initial value $A_0$ of the end point parameter is given as a tentative value obtained by adding the constant $A_s$ to the temperature data $T_a$ at sampling time $S_a$. Equation (2b) is established such that a gradient of a tangent of equation (1) at sampling time $S_b$ in the immediately preceding step is equal to the temperature gradient K. Equation (2c) is established such that a value of equation (1) at sampling time $S_a$ in the current step is set to be equal to $T_a$. Substitutions of $U_{(s)} = A - C/(S+C)$ as equation (1) into the left-hand side of equation (2b) of simultaneous equations (2) and $U_{(Sa)} = A - C/(S_a+B)$ into the left-hand side of equation (2c) and their development yield initial parameters as follows:

$$A_0 = T_a + A_s \tag{3a}$$

$$B_0 = A_s/K + S_b \tag{3b}$$

$$C_0 = A_s^2/K \tag{3c}$$

Step SP₁

As shown in FIG. 10, in this step, the first parameters A and B are calculated. When the sampling time has elapsed by one step from immediately preceding step SP₀, the temperature data stored in the memory areas $M_a$, $M_b$, and $M_c$ are updated as $T_a=T_4$, $T_b=T_3$, and $T_c=T_2$. As a result, a new value of the temperature gradient K is calculated based on the new temperature data, while simultaneous equations (4) are established as follows:

$$dU_{(s)}/dS_{(Sb)} = K \qquad (4b)$$

$$U_{(Sa)} = T_a \qquad (4c)$$

Equations (4b) and (4c) respectively correspond to equations (2b) and (2c) in step SP₀. Therefore, new parameters can be calculated in the same manner as in step SP₀, i.e., by substituting $U_{(s)} = A - C/(S+B)$ and $U_{(Sa)} = A - C/(S_a+B)$ for the left-hand sides of equations (4b) and (4b), letting the value of the parameter C be the value $C_0$ calculated in the immediately preceding step, and developing the resultant equations as follows:

$$A_1 = T_a + C_0/(S_a + B_1) \qquad (5a)$$

$$B_1 = C_0/K - S_b \qquad (5b)$$

Thereafter, a prediction value $U_{(Se)}$ of the body temperature after predetermined time $S_e$, which is a predetermined prediction time, is calculated according to the following equation obtained by applying the newly calculated parameters $A_1$ and $B_1$, and the parameter $C_0$ calculated in the preceding step to equation (1).

$$U_{(Se)} = A_1 - C_0/(S_e + B_1)$$

Figure 14:
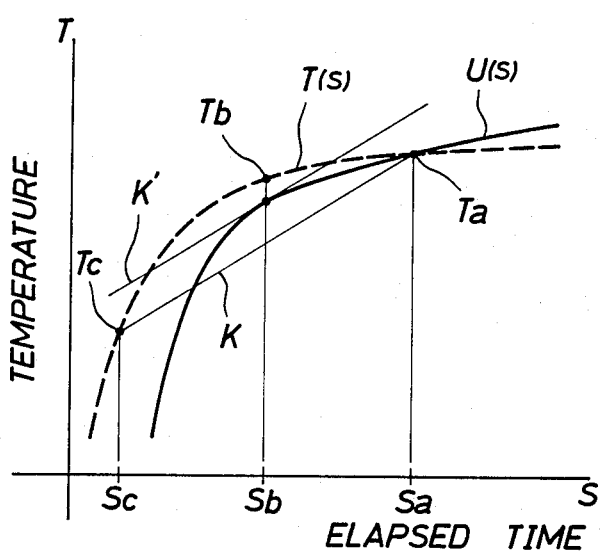
FIG. 14 is a graph showing a relationship between a body temperature rise curve and a calculated body temperature prediction curve.

FIG. 14 is a graph for facilitating understanding of simultaneous equations (4), wherein the parameters $A_1$ and $B_1$ are calculated such that the prediction curve $U_{(s)}$ obtained by equation (4) has a value equal to the temperature gradient K at sampling time $S_b$ and includes the current temperature data $T_a$.

Figure 15:
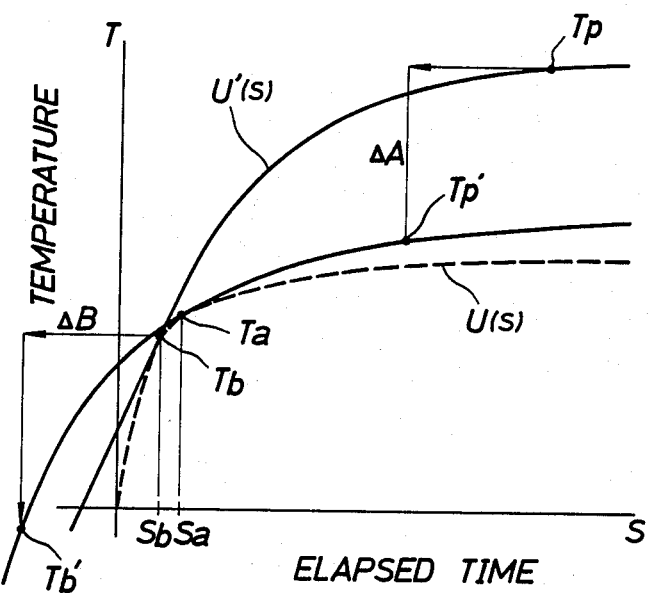
FIG. 15 is a graph showing a process wherein a body temperature prediction curve is changed by changing the parameters A and B upon calculations.

FIG. 15 shows a process in which different prediction curves are obtained by updating the parameters A and B, wherein $U'_{(s)}$ and $U_{(s)}$ represent the prediction curves obtained in steps SP₀ and SP₁, respectively.

More specifically, the prediction curve $U'_{(s)}$ is translated in the X direction by $\Delta B$ by updating the parameter B, and translated in the Y direction by $\Delta A$ by updating the parameter A, thereby obtaining the further new prediction curve $U_{(s)}$.

Step SP₂

As shown in FIG. 10, in this step, the parameters A and C are calculated. When sampling time has elapsed by one step from the preceding step SP₁, the temperature data stored in the memory areas $M_a$, $M_b$, and $M_c$ are updated as $T_a=T_5$, $T_b=T_4$, and $T_c=T_3$, as shown in table 1. A new value of the temperature gradient K is calculated based on the new temperature data, while simultaneous equations (4) are established in the same manner as in step SP₁ as follows:

$$dU_{(s)}/dS(s=S_b) = K \qquad (4b)$$

$$U_{(Sa)} = T_a \qquad (4c)$$

New parameters are calculated by substituting $U_{(s)} = A - C/(S+B)$ and $U_{(sa)} = A - C/(S_a+B)$ into the left-hand sides of equations (4b) and (4c), respectively, letting the value of the parameter B be the value $B_1$ calculated in the preceding step, and developing the resultant equations as follows:

$$A_2 = T_a + C_1/(S_a + B_1) \qquad (6a)$$

$$C_1 = (S_b + B_1)^2 K \qquad (6c)$$

Subsequently, the prediction value $U_{(Se)}$ of the temperature after predetermined time $S_e$ according to the following equation obtained by applying the newly calculated parameters $A_2$ and $C_1$ based on equation (1), and the parameter $B_1$ calculated in the preceding step.

$$U_{(Se)} = A_2 - C_1/S_e + B_1)$$

Figure 16:
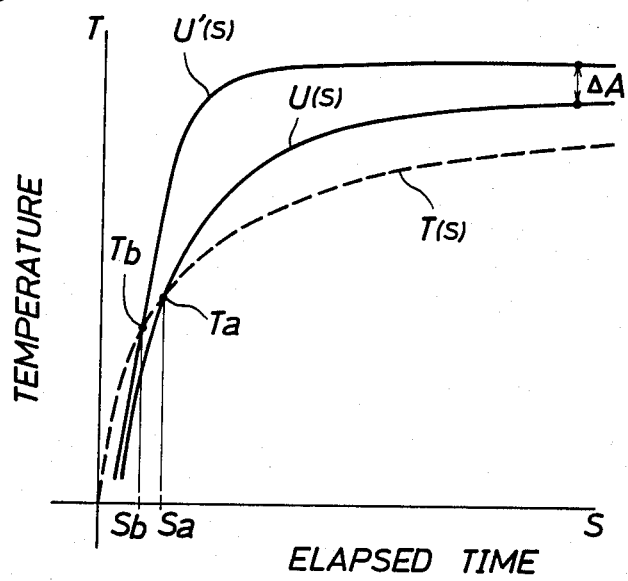
FIG. 16 is a graph showing a process wherein a body temperature prediction curve is changed by updating the parameters A and C upon calculation.

FIG. 16 shows a process in which different curves are obtained by updating the calculated parameters A and C, wherein $U'_{(s)}$ and $U_{(s)}$ represent prediction curves obtained in step SP₁ and SP₂, respectively. More specifically, a curvature of the prediction curve $U'_{(s)}$ is changed by updating the parameter C, and translated in the Y direction by updating the parameter A, thereby obtaining the further new prediction curve $U_{(s)}$.

Step SP₃

The operation in step SP₃ is the same as that in step SP₁.

Step SP₄

The operation in step SP₄ is the same as that in step SP₂. The operations in steps SP₁ and SP₂ are repeated for a predetermined period of time.

Step SP₅

As shown in FIG. 10, step SP₅ is a step of calculating the parameters B and C, wherein final fine adjustment is performed with respect to the prediction curve $U_{(s)}$ which has been corrected to substantially coincide with the body temperature rise curve $T_{(s)}$ by repeating the calculations of the parameters A and B, and A and C in preceding steps SP₁ to SP₄.

In this step, the following simultaneously equations (7) are employed.

$$dU_{(s)}/dS(s=S_b) \qquad (7b)$$

$$U_{(Sb)} = T_b \qquad (7c)$$

Equation (7b) corresponds to equations (2b) and (4b) in simultaneous equations (2) and (4). Equation (7c), however, is unique in this step. In consideration of the fact that the prediction curve substantially coincides with the body temperature rise curve, as described above, parameters $B_3$ and $C_3$ are calculated such that the prediction curve has a gradient equal to the temperature gradient K at sampling time $S_b$ and includes the temperature data $T_b$, thereby obtaining the prediction curve more accurately approximated to the body temperature rise curve. The following new parameters are calculated by substituting $U_{(s)} = A - C/(S+B)$ and $U_{(Sb)} = A - C/(S_b+B)$ into the left-hand sides of equations (7b) and (7c), respectively, letting the value of the parameter A be equal to the value $A_4$ calculated in the preceding step, and developing the resultant equations as follows:

$$B_3 = (A_4 - T_b)/K - S_b \tag{8b}$$

$$C_3 = (A_4 - T_b)^2/K \tag{8c}$$

Subsequently, the final prediction value $U_{(Se)}$ of the body temperature is calculated according to equation (1) using the parameters $B_3$ and $C_3$ newly calculated in step $SP_5$ and the parameter $A_4$ calculated in the preceding step as final parameters $A_e$, $B_e$, and $C_e$ as follows:

$$U_{(Se)} = A_e - C_e/(S_e + B_e)$$

Figure 1:
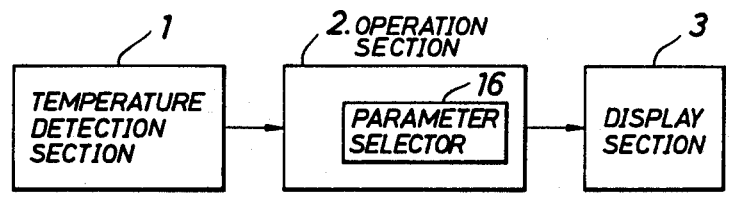
FIG. 1 is a block diagram showing a basic arrangement of a conventional prediction type electronic clinical thermometer.
Figure 2:
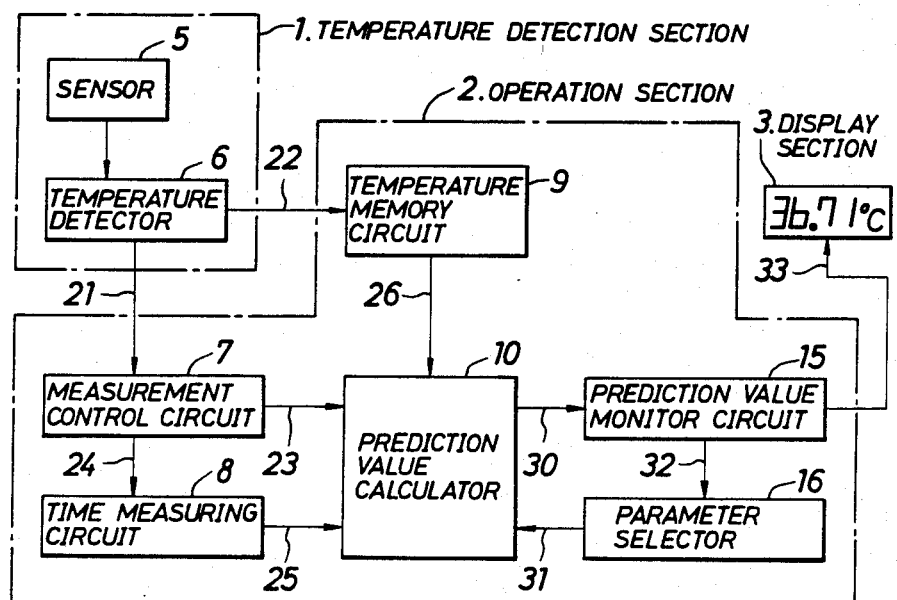
FIG. 2 is a block diagram showing a detailed circuit arrangement of the conventional prediction type electronic clinical thermometer in FIG. 1.
Figure 3:
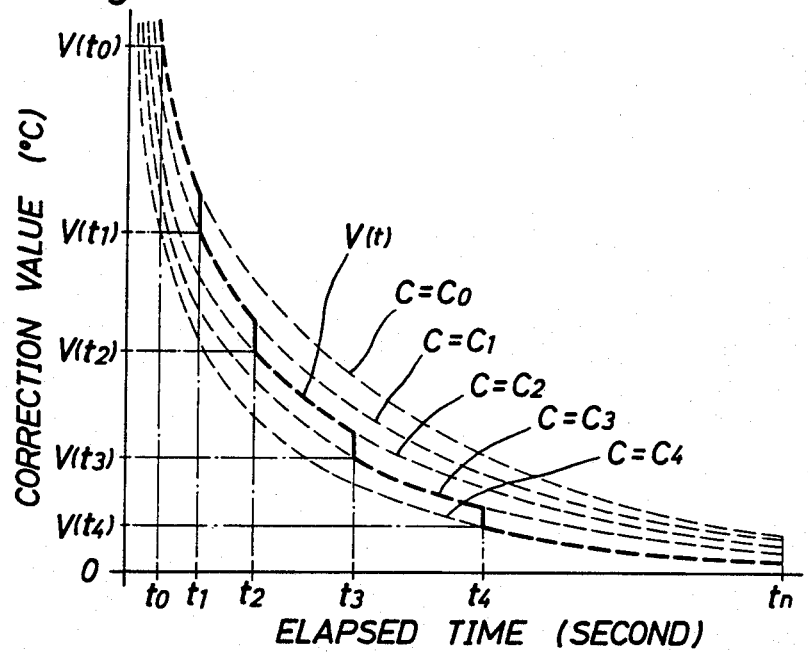
FIG. 3 is a graph showing a change in correction value as a function of time in the conventional prediction type electronic clinical thermometer.
Figure 4:
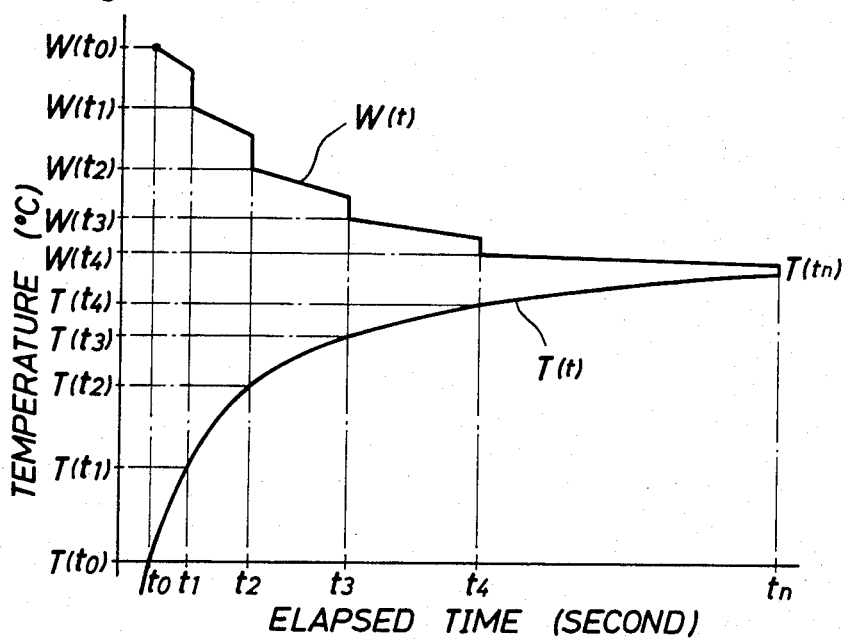
FIG. 4 is a graph illustrating a change in actual body temperature rise curve and prediction value in the conventional prediction type electronic clinical thermometer.

An embodiment of the present invention will be described below with reference to the accompanying drawings. The same reference numerals as in FIG. 2 denote the same components in FIGS. 17 and 18.

Figures 17, 18:
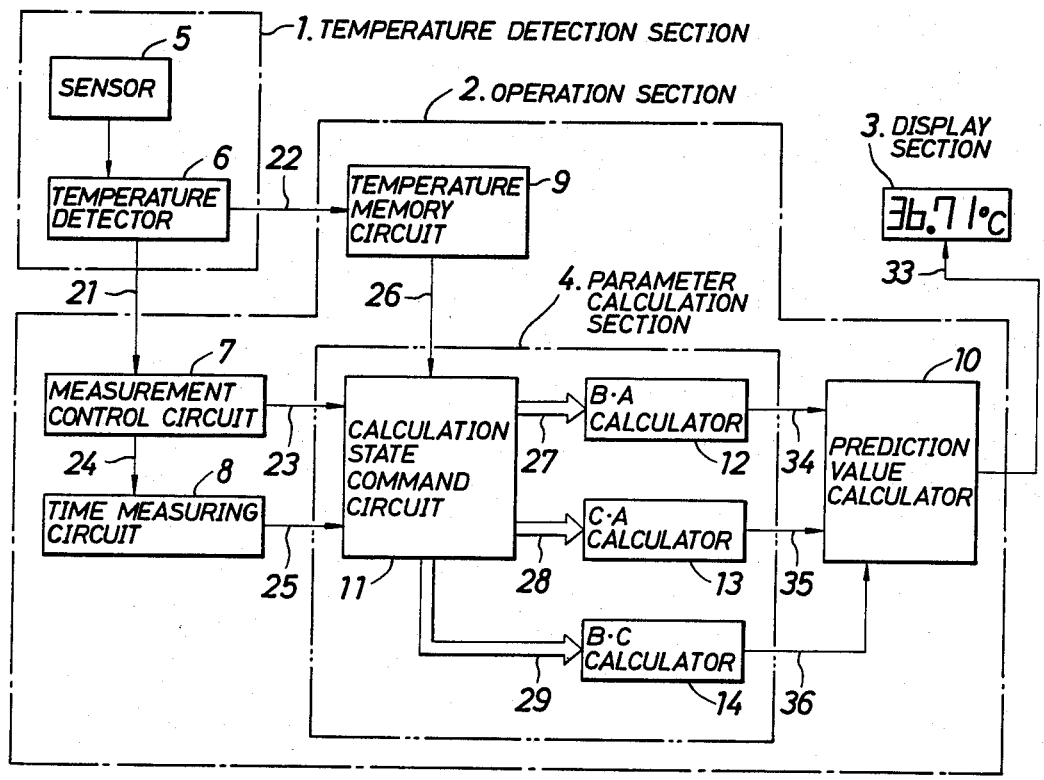
FIG. 17 is a block diagram showing a basic arrangement of a prediction type electronic clinical thermometer according to the present invention.
FIG. 18 is a block diagram showing a detailed circuit arrangement of the prediction type electronic clinical thermometer according to the present invention shown in FIG. 17.

FIG. 17 is a block diagram showing a basic arrangement of an electronic clinical thermometer capable of calculating a prediction value of an optimal equilibrium temperature according to the present invention. A temperature detection section 1 detects a temperature of a portion to be measured and intermittently outputs the resultant values as electrical signals. The temperature detection section 1 is connected to an operation section 2. The operation section 2 includes a parameter operation section 4 and calculates a prediction value of an equilibrium temperature based on the temperature data input from the temperature detection section 1, thereby outputting the resultant value to a display section 3 as an electrical signal. The parameter calculation section 4 is a section for calculating parameters of an equation for providing a prediction value. The display section 3 is a section for converting the prediction value input from the operation section 2 as an electrical signal into a numeral value of a body temperature corresponding to the prediction value and displaying the resultant value.

FIG. 18 is a block diagram showing a detailed arrangement of the electronic clinical thermometer capable of calculating a prediction value according to the present invention. The temperature detection section 1 is constituted by a sensor 5 such as a thermistor, and a temperature detector 6. In the temperature detection section 1, temperature signals output from the sensor 5 in response to body temperatures are intermittently output to the operation section 2 as temperature data signals 21 and 22 corresponding to the temperature data $T_a$ to $T_c$ detected by the temperature detector 6.

The operation section 2 comprises a measurement control circuit 7, a time measuring circuit 8, a temperature memory circuit 9, the parameter calculation section 4, and a prediction value calculator 10. When the measurement control circuit 7 receives the temperature data signal 21 from the temperature detector 6, and the same operation start conditions as in the conventional example, i.e., that 10 seconds have elapsed after 30° C. or more or 0.1° C./sec. or more is detected, are satisfied, operation command signals 23 are intermittently output to the parameter calculation section 4 in synchronism with output timings of the temperature data signals 21 from the temperature detector 6 after a predetermined operation. When the parameter calculation 4 receives the signals from the measurement control circuit 7, the parameter calculation section 4 calculates a plurality of parameters A, B, and C of an equation for providing a prediction value of an equilibrium temperature in response to signals from the time measuring circuit 8 and the temperature memory circuit 9 according to predetermined operations, thereby outputting a B·A signal 34, a C·A signal 35, and a B·C signal 36 (to be generally referred to as parameters signals hereinafter) to the prediction value calculator 10.

The prediction value calculator 10 receives the parameter signals 34, 35, and 36, and then outputs resultant values to the display section 3 according to predetermined operations. Note that the detailed arrangements and operations of the temperature detection section 1, the measurement control circuit 7, the time measuring circuit 8, and the temperature memory circuit 9 are the same as those of the conventional example.

Accordingly, in the arrangement according to the present invention, the parameter calculation section 4 is arranged in place of the prediction value monitor circuit 15 and the parameter selector 16, which constitute the operation section 2, so that signals flow in one direction from the parameter calculation section 4 to the prediction value calculator 10 unlike in the conventional negative-feedback process constituted by the prediction value calculator 10, the prediction value monitor circuit 15, and the parameter selector 16. A process of calculating a prediction value will be described while the detailed arrangement and operation of the parameter calculation section 4 are mainly described with reference to a flow chart in FIG. 19 and a graph in FIG. 20.

In FIG. 18, the parameter calculating section 4 is constituted by a calculation state command circuit 11, a B·A calculator 12, a C·A calculator 13, and a B·C calculator 14. When the B·A calculator 12, the C·A calculator 13, and the B·C calculator 14 receive a B·A calculation signal 27, a C·A calculation signal 28, and a B·C calculation signal 29 (to be generally referred to as parameter calculation signals hereinafter), respectively, they calculate the three parameters A, B, and C of the equation for providing a prediction value. For example, the parameters B and A are calculated by operating the B·A calculator according to steps $SP_1$ to $SP_3$ shown in FIG. 10.

The calculation state command circuit 11 receives elapsed time data signals 25 ($S_a$ to $S_c$) and the temperature data signals 21 ($T_a$ to $T_c$) from the time measuring circuit 8 and the temperature memory circuit 9 each time the operation command signal 23 is input from the measurement control circuit 7. Each time the calculation state command circuit 11 receives the above signals and data, it outputs parameter calculation signals 27, 28, and 29 including the elapsed time data and the temperature data to the three parameter calculators 12, 13, and 14 in accordance with a predetermined rule to be described later. The parameter calculation signals 27, 28, and 29 are represented, e.g., a B·A calculation signal 27 with respect to the B·A calculator 12. Each time the parameter calculators 12, 13, and 14 receive the parameter calculation signals 27, 28, and 29, respectively, they calculate specified parameters on the basis of the elapsed time data and the temperature data and output them to the prediction value calculator 10 as parameter sigals 34, 35, and 36. The prediction value calculator 10 updates only parameters of the parameters A, B, and C corresponding to the input parameters signals, calculates a prediction value according to an equation determined by the updated parameters, and outputs the prediction value to the display section 3.

An operation will be described wherein a step of sampling time S requires 2 seconds, and a prediction time $S_e$ is set to be 300 seconds in an actual clinical thermometer.

In the actual clinical thermometer, a value of the prediction time is set to be 300 seconds, i.e., five minutes because an equilibrium temperature in the mouth is generally regarded to be obtained within five minutes after temperature detection is started. In the axilla (armpit) and in the rectum, equilibrium temperatures are to be detected after corresponding values of prediction time. For example, in the axilla, the value is ten minutes, and hence elapsed time S is 600 seconds.

Each time the calculation state command circuit 11 receives a signal from the measurement control circuit 7, it receives the elapsed time data S and corresponding temperature data $T_a$, $T_b$, and $T_c$ from the time measuring circuit 8 and the temperature memory circuit 9. In this case, the data $T_a$, $T_b$, and $T_c$ are the temperature data temporarily stored in the three memory areas $M_a$, $M_b$, and $M_c$ constituting the temperature memory circuit 9, as shown in table 1.

Since the sampling time of the temperature detection described above is two seconds, the elapsed times $S_b$ and $S_c$ are the values given two and four seconds before the current value $S_a$, respectively. When the calculation state command circuit 11 receives the first operation command signal 23 from the measurement control circuit 7 1 after the power switch is turned on, the operation in [Step $SP_0$] is performed, and the calculation state command circuit 11 resets the parameters A, B, and C, thereby outputting them as the initial values, as described above.

$$A_0 = T_a + A_s \tag{3a}$$

$$B_0 = A_s/K + S_b \tag{3b}$$

$$C_0 = A_s^2/K \tag{3c}$$

Subsequently, as described above, each value of the parameters is processed as a temporary value. In this state, the calculation state command circuit 11 does not output a parameter calculation signal to each of the parameter calculators, i.e., the B·A calculator 12, C·A calculator 13, and the B·C calculator 14, and hence a prediction value is not calculated. After two seconds, when the operation command signal 23 is output from the measurement control circuit 7, the operation in [Step $SP_1$] is performed, the calculation state command circuit 11 receives the operation command signal 23, and the elapsed time data S and the corresponding temperature data $T_a$, $T_b$, and $T_c$ from the time measuring circuit 8 and the temperature memory circuit 9, respectively. Each value of the data S and $T_a$, $T_b$, and $T_c$ is updated to be the newest value at the current time. The calculation state command circuit 11 outputs the B·A calculation signals 27 including the elapsed time data S and the temperature data $T_a$, $T_b$, and $T_c$, and the B·A calculator 12 receives them to calculate a parameter $B_1$ according to the following equation.

$$B_1 = \sqrt{K/C_0} - S_b \tag{5a}$$

where $C_0$ is a value obtained in the preceding step and serves as an initial value. As a result, a parameter $A_1$ is calculated according to the following equation.

$$A_1 = T_a + C_0/(S_a + B_1) \tag{5b}$$

The parameters $B_1$ and $A_1$ calculated by equations (5a) and (5b) are output as the B·A signal 34.

The prediction value calculator 10 updates a value of a parameter in accordance with an input signal, and determines equation (1) for providing a prediction value, thereby calculating a prediction value U according to the following equation.

$$U_{(Se)} = A_1 - C_0/(300 + B_1) \tag{1a}$$

This is a value obtained by substituting the parameters A, B, and C into functional equation (1), and letting the prediction time $S_e$ of the elapsed time S be 300 seconds. Thereafter, the prediction value $U_{(Se)}$ calculated by equation (1a) is output to the display section 3 as a prediction value 33. As a result, a corresponding numeral value is displayed. When a signal from the measurement control circuit 7 is input to the calculation state command circuit 11 again, the operation in [Step $SP_2$] is performed, and the calculation state command circuit 11 outputs the C·A calculation signal 28 to the C·A calculator 13. The C·A calculator 13 calculates corresponding parameters $C_1$ and $A_2$ according to the following equation.

$$C_1 = K \times (S_b + B_1)^2 \tag{6c}$$

The value of the parameter $A_2$ can be given according to the result as follows:

$$A_2 = T_a + C_1/(S_a + B_1) \tag{6a}$$

In equations (6a) and (6c), the value of the parameter $B_1$ is the one obtained when the parameter B·A is calculated in the preceding step. The values of the parameters $C_1$ and $A_2$ obtained according to equations (6a) and (6c) are output as a C·A signal 35. Thereafter, in the prediction value calculator 10, the values of the parameters C and A are updated in accordance with the C·A signal 35, and hence functional equation (1) is determined, thereby calculating the prediction value $U_{(Se)}$ according to equation (1b) and outputting the resultant value to the display section 3 as the prediction value signal 33.

$$U_{(Se)} = A_2 - C_1/(300 + B_1) \tag{1b}$$

In this case, the prediction value which has been displayed is updated. After two seconds, the operation command signal 23 is output from the measurement control circuit 7 again, and the operation in [Step $SP_3$] is performed. As a result, the same operation as in the second step, i.e., four seconds before the current time, is repeated. When the operation command signal 23 is input to the calculation state command circuit 11, the calculation state command circuit 11 outputs the B·A calculation signal 27 including the elapsed time data and the temperature data, calculates parameters $B_2$ and $A_3$, and then outputs the B·A signal 34 corresponding thereto to the prediction value calculator 10. In the prediction value calculator 10, the values of the parameters are updated in accordance with the B·A signal 34 to determine equation (1), thereby calculating the prediction value $U_{(Se)}$ and outputting the value to the display section 3 as the prediction value signal 33. The B·A calculator 12 and the C·A calculator 13 are alternately operated until the predetermined condition is satisfied, so that the parameters B and A, and C and A are repeatedly calculated. Although in this embodiment, the predetermined condition means a lapse of a predetermined period of time, but may be a number of, e.g., operation cycles of the B·A calculator 12 and the C·A calculator 13. After the condition is satisfied, when the calculation state command circuit 11 receives a signal from the measurement control signal 7, the operation in [Step SP5] is performed, and the calculation state command circuit 11 outputs the B·C calculation signal 29 including the elapsed time data and the temperature data to the B·C calculator 14. The B·C calculator 14 receives the calculation signal 29, calculates the values of parameters $B_3$ and $C_3$ according to the following equations, and outputs them to the prediction value calculator 10.

$$B_3 = (A_4 - T_b)/K - S_b \tag{8b}$$

$$C_3 = (A_4 - T_b)^2/K \tag{8c}$$

wherein the parameter $A_4$ is the value calculated when the parameter B·A or C·A is calculated in the preceding step. The prediction value calculator 10 receives the B·C signal 36 corresponding to the parameters $B_3$ and $C_3$, determines function (1) in the same manner as described above, calculates the prediction value $U_{(Se)}$, and outputs the resultant value to the display section 3. At the same time, a buzzer or the like is operated to indicate that the displayed value is the final prediction value.

The above-described operation will be summarized below. When the predetermined condition (10 seconds have elapsed after 30° C. or more or 0.1° C./sec. or more is detected) is satisfied, and the operation is started, the values of the parameters A, B, and C are reset to be the initial values. Then, the parameters B and A are calculated, and the parameters C and A are calculated. This operation is repeated in the subsequent steps, the prediction value is updated each time, and the updated values are successively displayed. The values of the parameters $B_e$ and $C_e$ are calculated after the predetermined period of time, and the final prediction value $U_{(Se)}$ is displayed while the buzzer is sounded.

FIG. 20 shows characteristic curves showing a series of operations according to the method of calculating the prediction value from the start of temperature detection to the display of the final prediction value. In FIG. 20, values 0, 2, 4, ... representing elapsed times S along the abscissa are detected by the temperature detection section 1. Each value represents a time when temperature data is output, while each value is synchronized with a timing when the calculation state command circuit 11 outputs a signal to each of the parameter calculators 12, 13, and 14. Elapsed time S is not a time counted from the start of temperature detection, but is a time counted by setting detection start time in the operation section 2 to be zero seconds. Accordingly, reference symbols $T_{(0)}$, $T_{(2)}$, ... denote actual temperatures when elapsed times S are 0, 2, ..., and are plotted as the continuous curve $T_{(s)}$. Reference symbol $T_{(300)}$ denotes an equilibrium temperature, which is detected 300 seconds after detection of a temperature in the mouth is started. Reference symbols $U_{(0)}$, $U_{(2)}$, ... denote prediction values calculated when the values of elapsed times S are 0, 2, ... Changes in value with the lapse of time are represented by $U_{(s)}$. In addition, functions for providing the prediction values $U_{(0)}$ to $U_{(10)}$ are respectively represented by curves $U_{ABC}$ to $U_{BC}$ indicated by broken lines. Accordingly, as in the equilibrium temperature, the values calculated based on functional equation (1) at elapsed time S after 300 seconds are the prediction values $U_{(0)}$ to $U_{(10)}$.

When the power switch is turned on and detection of temperature is started, the temperature rises while temperature values are plotted as the curve $T_{(s)}$. Subsequently, if the predetermined condition (that 10 seconds have elapsed after 30° C. or more or 0.1° C./sec. or more is detected) is satisfied at time S as 0, the operation command signal 23 is output from the measurement control circuit 7, thereby resetting the parameters A, B, and C to be the initial values. Although a prediction value is not calculated at this time in practice, for the sake of simplicity, a prediction value is calculated and indicated as $U_{(0)}$. After two seconds, when a signal is input, the values of the parameters B and A are calculated and an equation is determined to plot the curve $U_{BA}$. As a result, the prediction value $U_{(2)}$ is calculated. After four seconds from the start, the values of the parameters C and A are calculated in the same manner as described above, and an equation for plotting the curve $U_{CA}$ is determined, thereby obtaining the prediction value $U_{(4)}$. This process is repeated until a predetermined period of time is elapsed. Assume that this condition is satisfied after 10 seconds. The values of the parameters B and C are calculated and an equation for providing the curve $U_{BC}$ is determined, thereby obtaining the final prediction value $U_{(10)}$.

Figure 19:
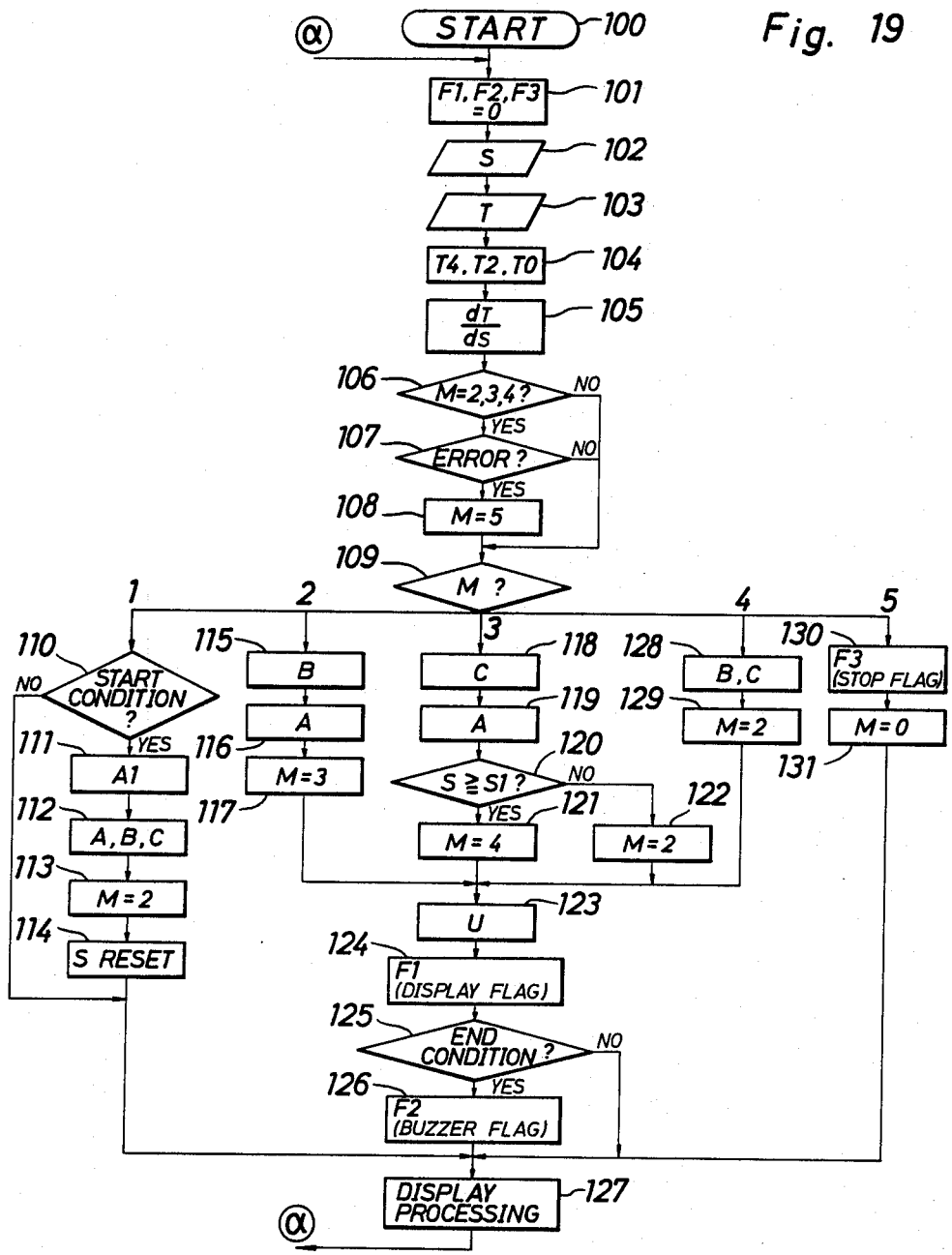
FIG. 19 is a flow chart showing an operation of the prediction type electronic clinical thermometer according to the present invention.

FIG. 19 is a flow chart showing a detailed operation of the thermometer shown by the block diagram of FIG. 17. In steps 100 to 108, operations of temperature detection and error detection are mainly shown. In the steps of error detection, whether a temperature is correctly measured or not is detected, wherein a state of temperature rise is always monitored and when measurement is determined to be incorrect, the determination is informed, thereby stopping the execution. Since this operation is not directly related to the present invention, a detailed description thereof will be omitted. Branch steps below decision step 109 are classified according to modes M represented by numeral values 1 to 5. Each mode is determined by a state when a prediction value is calculated, so that a flow advances to a branch corresponding to a numeral value of the mode M in decision step 109. In the branch corresponding to the mode 1, a condition is monitored where parameters of an equation are calculated or not, while an initial value of each parameter is provided after the operation is started. In the branches corresponding to the modes 2 to 4, the parameters are calculated. In the branch corresponding to the mode 5, the above-described error or the like is displayed and the operation is stopped. In steps 123 to 127, a prediction value is obtained according to the calculated parameters, the process related to display and the buzzer is performed.

When the power switch is turned on in step 100, whole circuits at FIG. 17 are brought into operational condition. In this state, mode M is set to "1" and other data is initialized. In step 101, flags F1, F2 and F3 for display, buzzer, and operation rest are initialized or set to "0" and operation advances to elapsed time measuring step 102 and then to temperature detection step 103. In step 104, temperature data is temporarily stored and the present data, that is the temperature just detected in step 103, is stored at "T0". Thereafter, whenever step 104 is passed, the latest temperature data is always stored as T0, the preceding data is stored in such shifted manner as T0→T2 and T2→T4.

In step 105, the rate of change of temperature with respect to the elapsed time in temperature inclination K is calculated. In step 106, the type of mode M is judged. In the initial stage, mode M is "1" and operation jumps to step 109 and advances to step 110 where it is judged whether a given condition which will be described later is satisfied or not. If the condition is not satisfied, operation advances to display processing step 127. However, as display flag F1 is "0", nothing is displayed and operation returns to step 101. The same process as described above is repeated until it is judged in step 110 that a pre-determined condition is satisfied.

In step 107, it is determined whether operation is in error or not. If it is, mode M is set to "5" in step 108. If it is not, then step 108 is bypassed. In step 109, the mode is determined. In step 110, it is determined whether the condition (i), (ii), and (iii) is satisfied or not. If it is satisfied, a value of a constant A1 is read out in step 111, and then initial values of the parameters A, B, and C are calculated by parameter calculation section 4. This calculation by parameter calculation section 4 is completed in step 112.

Referring back to step 107, if an error in operation is detected in step 107, the mode is set to 5 in step 108 and operation will advance to step 130 where stop flag F3 is set to bring the device into a rest condition. At that point, mode M is reset to "0" in step 131. In this case, the predetermined conditions may be those shown in the conventional example. However, in order to improve precision and shorten a calculation time, the conditions are set as follows:

(i) Elapsed time S is four seconds or more. 1
(ii) The temperature data $T_0$ is 34° C. or more.
(iii) The temperature gradient K falls within the range from 0.02° to 0.06° C.

The condition (i) is set because a time required for storing all the temperature data $T_0$, $T_2$, and $T_4$ in step 104 is four seconds after the power switch is turned on.

When all the conditions (i) to (iii) are satisfied, and the measurement control circuit 7 outputs a signal to the calculation state command circuit 11, the flow advances to step 111, in which a value of a constant $A_1$ is read out, and initial values of the parameters A, B, and C for equation (1) are calculated. In step 113, the mode M is set at 2, and the preparation for outputting a signal to the B·A calculator 12 is made. The measurement control circuit 7 outputs a signal to the time measuring circuit 8. In step 114, elapsed time S is reset as S=0, the time measuring circuit 8 starts counting time again. Thereafter, steps 101 to 109 are repeated. When the measurement control circuit 7 successively outputs signals, the calculation state command circuit 11 supplies a signal to the B·A calculator 12, thereby calculating values of the parameters B and A in steps 115 and 116. After the mode M is set at 3 and the preparation for calculation of the parameters C and A is made in step 117, step 123 is performed by the prediction value calculator 10, thereby calculating a prediction value U. The prediction value U is displayed on the display section 3 in display processing step 127 by setting display flag F1 at logic "1" in step 124. In step 125, whether a condition for stopping the calculation of parameters is satisfied or not is detected. In this case, the condition is set as follows:

(iv) Elapsed time S is 10 seconds or more. In decision step 126, a buzzer is set to be sounded when the condition is satisfied, thereby displaying a final prediction value while the determination is informed by the buzzer.

Furthermore, in decision step 120, $S_1$ is set to be eight seconds so as to set a condition as follows:

(v) Elapsed time S is eight seconds or more. The above condition is made so that calculations of the parameters B and A, and C and A are alternately repeated twice, the parameters B and C are calculated once as the final values, and the process of calculating the parameters A, B, and C is finished.

After the parameters B and A are calculated in steps 115 and 116, and a series of operations up to step 124 is finished, if the above condition is not satisfied in decision step 125, display is performed in the display section 3 in step 127, and then the flow returns to step 101. The flow advances to step 109 by repeating the above operations. Subsequently, steps 118 and 119 are successively executed when the calculation state command circuit 11 outputs a signal to the C·A calculator 13 in response to an input signal from the measurement control circuit 7. Since current elapsed time S is four (seconds), step 120 determines that the condition (v) is not satisfied, and the flow advances to next step 122 to set the mode M at 2 and advances to steps 115 and 116 of calculating the parameters B and A, again. Thereafter, the process of calculating the parameters is performed in the same manner as described above, and the parameters C and A are calculated in steps 118 and 119 when elapsed time S is eight seconds. Since the condition (v) is satisfied in decision step 120, the flow advances to step 121, in which the mode M is set at 4. When elapsed time S is 10 seconds and the flow advances from decision step 109 to step 128, the values of the parameters B and C are calculated and the flow advances to steps 129, 123, and 124 in the order named. Since the condition (iv) is satisfied in decision step 125, a buzzer flag F2 is set at logic "1" in step 126. In step 127, a prediction value is displayed and at the same time the buzzer is sounded, thereby finishing all the steps. Although the conditions (iv) and (v) are set as described above in steps 125 and 120, the method of calculating the parameters can be changed by setting the conditions, e.g., as follows. In steps 125 and 120, the conditions are respectively changed as:

(vi) Elapsed time S is 14 seconds or more.
(vii) Elapsed time S is 12 seconds or more.

By changing the conditions (vi) and (vii) in this manner, a calculation of the parameters B and A in the mode 2 and a calculation of the parameters C and A in the mode 3 are alternately repeated three times, and finally, the parameters B and C are calculated in step 125. Similarly, if the conditions in steps 125 and 120 are set as follows:

(viii) Elapsed time S is 18 seconds or more.
(ix) Elapsed time S is four seconds or more.

Calculations in the modes 2, 3, and 4 are sequentially performed, thereby constituting one cycle. This cycle is repeated three times. The mode M is set at 2 in step 129 to cope with a situation wherein the above situation is realized. Although in the two cases described above, optimal precision of a prediction value with respect to an equilibrium temperature can be improved, a relatively long period of time is required to perform all calculations of the parameters and to display a final prediction value. The conditions (vi) and (v) shown in the embodiment balance and satisfy both prediction precision and prediction time.

What is claimed is:

1. An electronic clinical thermometer capable of calculating a prediction value of an optimal equilibrium temperature, comprising:

a temperature detection section for detecting a temperature of a body portion to be measured;

an operation section for predicting an equilibrium temperature according to the equation $U=A-C/(S+B)$ based on a temperature detected by said temperature detection section wherein U is a prediction value of a body temperature calculated according to said equation; S is an elapsed time; A is an end point parameter for shifting in parallel a predicted body temperature curve plotted by said equation along a first axis (body temperature axis); B is a start point parameter for shifting in parallel the predicted body temperature curve along a second axis (time axis); and C is a gradient parameter for changing a curvature of the predicted body temperature curve to extend or reduce the predicted body temperature curve in the direction of said first or second axis; and a display section for displaying a value calculated by said operation section, wherein said operation section includes a temperature memory circuit for temporarily storing a plurality of temperature data detected by said temperature detection section, a time measuring circuit for measuring an elapsed time of temperature detection and outputting elapsed time data, a parameter calculation section for receiving said plurality of temperature data and said elapsed time data to calculate parameters of said equation, and a prediction value calculator for calculation an equilibrium temperature according to said equation using parameters newly calculated by said parameter calculation section.

2. A thermometer according to claim 1, wherein said parameter calculation section comprises three parameter calculators for calculating the three parameters A, B, and C by combining two of the three parameters, and a calculation state command circuit for supplying operation command signals to said three parameter calculators according to a predetermined order.

3. A thermometer according to claim 2, wherein said prediction value calculator calculates the equilibrium temperature according to said equation by applying newly calculated values for two of said three parameters calculated by said parameters calculation section and the third parameter calculated by said parameter calculation section in an immediately preceding step.

4. A thermometer according to claim 1, wherein said operation section includes a measurement control circuit for constantly monitoring the temperature data intermittently supplied from said temperature detection section, and controlling the operations of said time measuring circuit and said parameter calculation section, said measurement control circuit supplying a prediction start signal to said time measuring circuit by determining a prediction start condition set in accordance with the temperature data, and supplying the operation command signal to said parameter calculation section in synchronism with a sampling timing of said temperature detection section.

5. A thermometer according to claim 4, wherein the prediction operation start condition is determined by the time elapsed after operation of the thermometer has begun, temperature data, and temperature gradient data.

* * * * *